United States Patent
Till

(10) Patent No.: US 7,571,585 B2
(45) Date of Patent: Aug. 11, 2009

(54) BEVERAGE BOTTLING OR CONTAINER FILLING PLANT HAVING A BEVERAGE BOTTLE OR CONTAINER HANDLING MACHINE AND A METHOD OF OPERATION THEREOF

(75) Inventor: Volker Till, Hofheim/Taunus (DE)

(73) Assignee: KHS Maschinen- und Anlagenbau AG, Dortmund (DE)

( * ) Notice: Subject to any disclaimer, the term of this patent is extended or adjusted under 35 U.S.C. 154(b) by 15 days.

(21) Appl. No.: 11/690,624

(22) Filed: Mar. 23, 2007

(65) Prior Publication Data

US 2007/0220835 A1 Sep. 27, 2007

(30) Foreign Application Priority Data

Mar. 25, 2006 (DE) .................. 10 2006 013 843

(51) Int. Cl.
*B65B 17/00* (2006.01)
(52) U.S. Cl. ..................... 53/167; 53/136.1; 53/173
(58) Field of Classification Search .............. 53/167, 53/281, 136.1, 94, 89, 173
See application file for complete search history.

(56) References Cited

U.S. PATENT DOCUMENTS

| 4,467,908 | A | * | 8/1984 | Schneider .................. 198/441 |
| 5,713,403 | A | * | 2/1998 | Clusserath et al. .......... 141/101 |
| 6,474,368 | B2 | * | 11/2002 | Clusserath et al. ............. 141/6 |
| 7,162,848 | B2 | * | 1/2007 | Jacobs et al. .................. 53/167 |
| 7,165,582 | B2 | * | 1/2007 | Till .............................. 141/89 |
| 7,331,152 | B2 | * | 2/2008 | Menke ........................... 53/67 |
| 7,404,277 | B2 | * | 7/2008 | Schach et al. ............. 53/136.1 |

FOREIGN PATENT DOCUMENTS

| DE | 696 01 495 T2 | 10/1999 |
| DE | 198 24 846 A1 | 12/1999 |
| DE | 695 27 216 T2 | 2/2003 |

* cited by examiner

*Primary Examiner*—Sameh Tawfik
(74) *Attorney, Agent, or Firm*—Nils H. Ljungman & Associates

(57) ABSTRACT

Beverage bottle or container filling plant having a stretch blow mold machine for the manufacture of bottles or similar containers by stretch blowing using preforms made of thermoplastic plastic, with a preheating station for the preheating of the preforms fed to this station and with a blowing station that has at least one blow mold.

6 Claims, 5 Drawing Sheets

BEVERAGE BOTTLING OR CONTAINER FILLING PLANT HAVING A BEVERAGE BOTTLE OR CONTAINER HANDLING MACHINE AND A METHOD OF OPERATION THEREOF

BACKGROUND

1. Technical Field

This application relates to a beverage bottling or container filling plant having a beverage bottle or container handling machine and a method of operation thereof.

2. Background Information

A beverage bottling plant for filling bottles with a liquid beverage filling material can possibly comprise a beverage filling machine, which is often a rotary filling machine, with a plurality of beverage filling positions, each beverage filling position having a beverage filling device for filling bottles with liquid beverage filling material. The filling devices may have an apparatus designed to introduce a predetermined volume of liquid beverage filling material into the interior of bottles to a substantially predetermined level of liquid beverage filling material.

Some beverage bottling plants may possibly comprise filling arrangements that receive a liquid beverage material from a toroidal or annular vessel, in which a supply of liquid beverage material is stored under pressure by a gas. The toroidal vessel may also be connected to at least one external reservoir or supply of liquid beverage material by a conduit or supply line. In some circumstances it may even be possible that a beverage bottling plant has two external supply reservoirs, each of which may be configured to store either the same liquid beverage product or different products. These reservoirs could possibly be connected to the toroidal or annular vessel by corresponding supply lines, conduits, or other arrangements. It is also possible that the external supply reservoirs could be in the form of simple storage tanks, or in the form of liquid beverage product mixers.

A wide variety of types of filling elements are used in filling machines in beverage bottling or container filling plants for dispensing a liquid product into bottles, cans or similar containers, including but not limited to filling processes that are carried out under counterpressure for the bottling of carbonated beverages. The apparatus designed to introduce a predetermined flow of liquid beverage filling material further comprises an apparatus that is designed to terminate the filling of the beverage bottles upon the liquid beverage filling material reaching the predetermined level in bottles. There may also be provided a conveyer arrangement that is designed to move bottles, for example, from an inspecting machine to the filling machine.

After a filling process has been completed, the filled beverage bottles are transported or conveyed to a closing machine, which is often a rotary closing machine. A revolving or rotary machine comprises a rotor, which revolves around a central, vertical machine axis. There may further be provided a conveyer arrangement configured to transfer filled bottles from the filling machine to the closing station. A transporting or conveying arrangement can utilize transport star wheels as well as linear conveyors. A closing machine closes bottles by applying a closure, such as a screw-top cap or a bottle cork, to a corresponding bottle mouth. Closed bottles are then usually conveyed to an information adding arrangement, wherein information, such as a product name or a manufacturer's information or logo, is applied to a bottle. A closing station and information adding arrangement may be connected by a corresponding conveyer arrangement. Bottles are then sorted and packaged for shipment out of the plant.

Many beverage bottling plants may also possibly comprise a rinsing arrangement or rinsing station to which new, non-return and/or even return bottles are fed, prior to being filled, by a conveyer arrangement, which can be a linear conveyor or a combination of a linear conveyor and a starwheel. Downstream of the rinsing arrangement or rinsing station, in the direction of travel, rinsed bottles are then transported to the beverage filling machine by a second conveyer arrangement that is formed, for example, by one or more starwheels that introduce bottles into the beverage filling machine.

It is a further possibility that a beverage bottling plant for filling bottles with a liquid beverage filling material can be controlled by a central control arrangement, which could be, for example, a computerized control system that monitors and controls the operation of the various stations and mechanisms of the beverage bottling plant.

Some beverage bottling plants also have a bottle or container manufacturing arrangement or machine or system in which the bottles or containers are manufactured or formed in the plant prior to filling and/or cleaning or rinsing. Stretch blow molding machines for the manufacture of bottles or similar hollow bodies using preforms made of a thermoplastic plastic material such as PET, for example, by heating and subsequent stretch blowing (blow molding) of the respective preforms are known in the beverage bottling industry. Stretch blow molding machines of this type essentially comprise a heating station in which the preforms are heated by a controlled temperature, and of a downstream blowing station in which the stretch blow molding takes place at a high rate or production and which, for this purpose, generally comprises a rotor or blow molding unit with a plurality of blow molds that is driven in rotation around a vertical machine axis. Both process steps, namely the preheating of the preforms and the downstream stretch blow molding are coupled directly to each other. Generally, the heat output and delivery capacity of the heating station are adapted to the output of the blow molding station.

In practice, downstream of the stretch blow molding machine is an additional part of a total plant, i.e. for example downstream of a stretch blow molding machine for the manufacture of bottles is a filling machine, which can then be directly interlocked with the stretch blow molding machine, for example. One disadvantage associated with some existing practices, especially relating to the stretch blow molding machines for the manufacture of bottles, is that in the event of a stoppage or problem in the downstream portion of the overall plant or in the machine immediately downstream, the stretch blow molding machine must continue to run until the heating station and a transport element that moves the preforms through the heating station and also the blow molds of the blow molding station are completely emptied. The number of preforms and bottles affected by this disadvantage is equal to the number of preforms and bottles that are normally being processed in two minutes of normal operation of a stretch blow molding machine. The bottles that are produced during this idling must be transferred outward and discarded if such bottles cannot be reused for lack of a suitable sorting system. A buffer storage of the bottles that are produced during the idling of the stretch blow molding machine in separate buffer storage systems is not possible because the bottles molded by stretch blow molding are extremely sensitive, and generally can be easily damaged and/or deformed, which means that they are no longer suitable for reuse.

There can be many different problems in a part of the overall plant downstream of the stretch blow molding machine or in another machine located downstream, and can be caused, for example, by a lack of operating media, a lack of product to be bottled in a downstream filling machine, back-ups in connected transport systems, mechanical or electrical faults in complex control systems etc. The idling of either the heating station or the stretch blow molding station or of both stations that is necessary in some cases during a shutdown or fault can result in significant material costs, for example, which on high capacity machines or plants in continuous operation can add up to approximately a six-figure amount.

OBJECT OR OBJECTS

An object of at least one possible embodiment of the present application is to indicate a stretch blow molding machine for the manufacture of bottles or similar hollow bodies by stretch blowing that eliminates the above mentioned disadvantage.

SUMMARY

At least one possible embodiment of the present application teaches a stretch blow molding machine for the manufacture of hollow bodies, in particular bottles, by stretch blowing with the use of preforms made of thermoplastic plastic, with a heating station for the preheating of the preforms that are fed to this station, and with a blowing station that has at least one blow mold, to which the preforms heated in the heating station are fed, wherein means which, in the event of a problem in the blowing station and or in a part of the plant that processes the hollow bodies downstream of the blowing machine, outwardly transfers at least some of the heated preforms while the heating station remains in operation. At least one other possible embodiment of the present application teaches a stretch blow molding machine for the manufacture of hollow bodies, generally bottles, by stretch blowing using preforms made of thermoplastic plastic with a heating station for the preheating of the preforms that are fed to this station, as well as with a blowing station that has at least one blow mold, to which blowing station the preforms heated in the heating station are fed, wherein means, that in the event of a problem in the blowing station and/or in a part of a plant that processes the hollow bodies downstream of the blowing machine, as the heating station remains in operation, block the feed of the preforms to the heating station and the transfer of preforms from the heating station to the blower station. At least one additional possible embodiment of the present application teaches a method for the manufacture of bottles or similar hollow bodies by stretch blow molding using preforms made of thermoplastic plastic, whereby the preforms are heated in a heating station and are deformed in the heated state in a blow mold of a blowing station into the individual hollow bodies, wherein in the event of a problem in the blowing station and/or in a part of the plant that processes the hollow bodies downstream of the stretch blow molding machine, the onward transfer of the heated preforms to the blowing station is interrupted and at least some of the preforms are transferred outward for reuse. At least one further possible embodiment of the present application teaches a method for the manufacture of bottles or similar hollow containers by blow molds using preforms made of thermoplastic plastic, whereby the preforms are heated in a heating station and in the heated state are deformed in a blow mold of a blowing station into the individual hollow bodies, characterized in that in the event of a problem, at least some of the preforms are retained in the heating station or are moved into a self-contained holding loop inside the heating station. Further developments of at least one possible embodiment of the present application are described herein.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

At least one possible embodiment of the present application is explained in greater detail below on the basis of the exemplary embodiments that are illustrated in the accompanying figures. In the figures.

DESCRIPTION OF EMBODIMENT OR EMBODIMENTS

Figure 1:
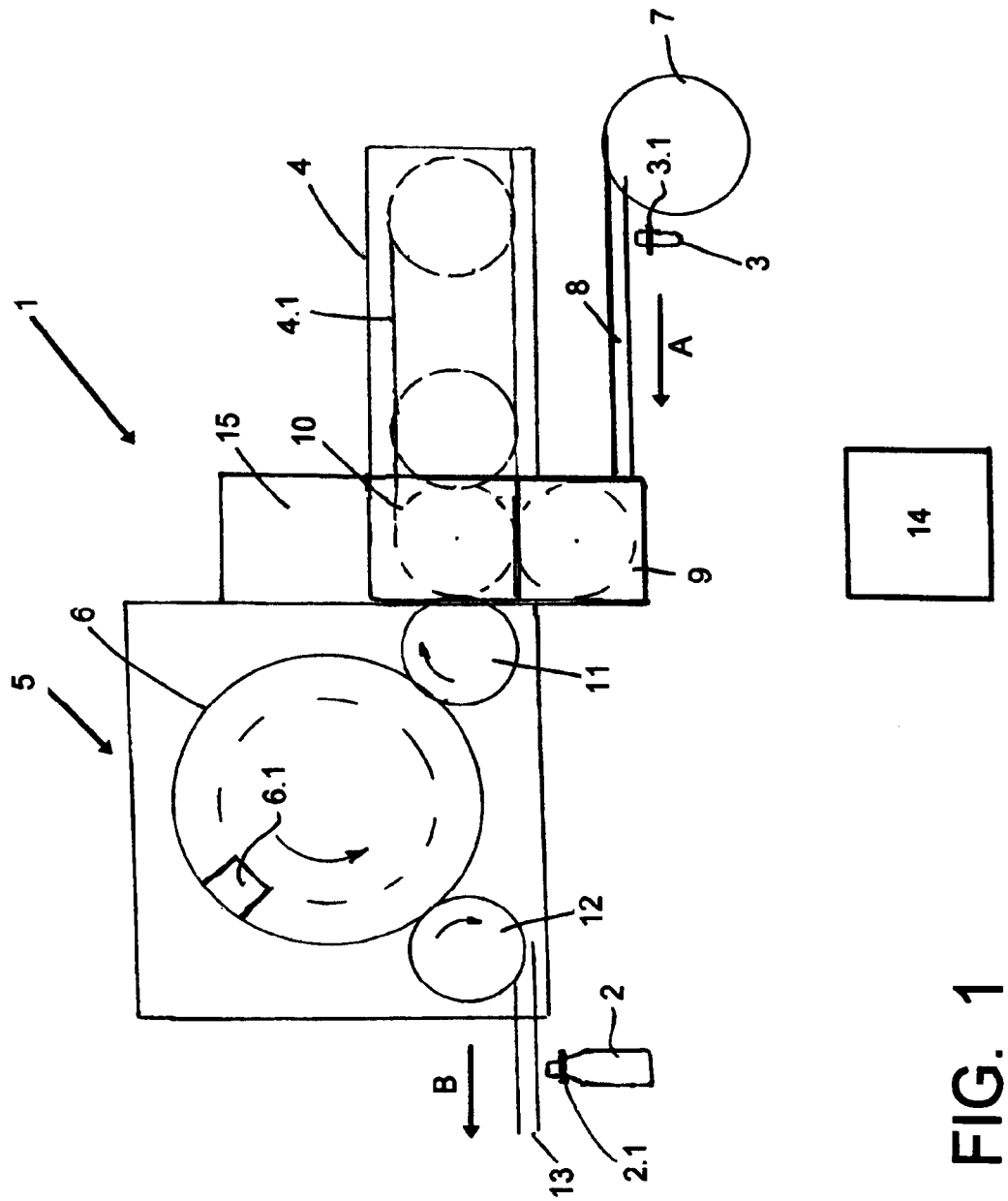
FIG. 1 shows in a simplified schematic view at least one embodiment of a stretch blow machine for the manufacture of plastic bottles from preforms by stretch blowing.
Figure 1A:
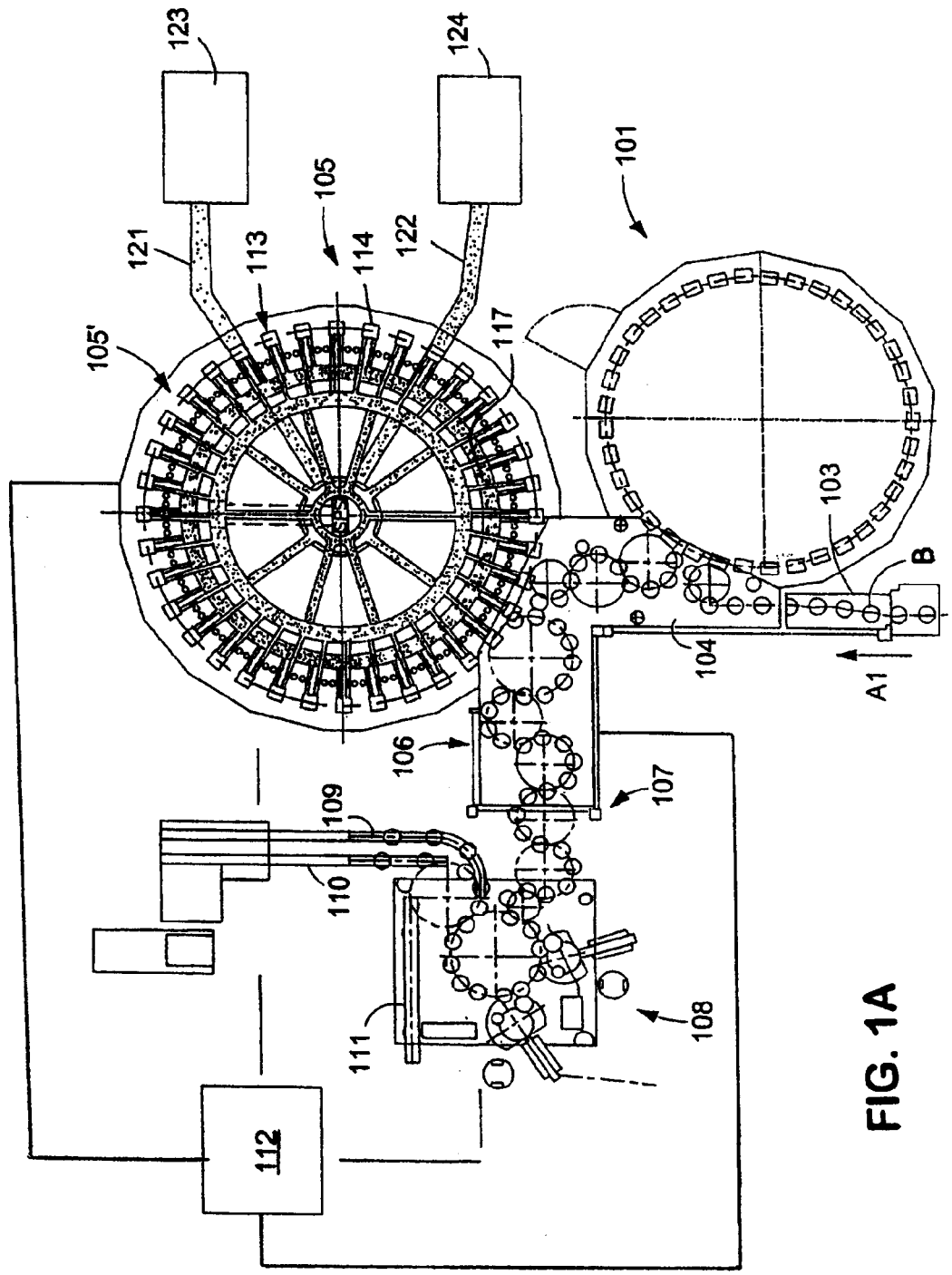
FIG. 1A shows schematically the main components of one possible embodiment example of a system for filling containers.

FIG. 1A shows schematically the main components of one possible embodiment example of a system for filling containers, specifically, a beverage bottling plant for filling bottles B with at least one liquid beverage, in accordance with at least one possible embodiment, in which system or plant could possibly be utilized at least one aspect, or several aspects, of the embodiments disclosed herein.

FIG. 1A shows a rinsing arrangement or rinsing station 101, to which the containers, namely bottles B, are fed in the direction of travel as indicated by the arrow A1, by a first conveyer arrangement 103, which can be a linear conveyor or a combination of a linear conveyor and a starwheel. Downstream of the rinsing arrangement or rinsing station 101, in the direction of travel as indicated by the arrow A1, the rinsed bottles B are transported to a beverage filling machine 105 by a second conveyer arrangement 104 that is formed, for example, by one or more starwheels that introduce bottles B into the beverage filling machine 105.

The beverage filling machine 105 shown is of a revolving or rotary design, with a rotor 105', which revolves around a central, vertical machine axis. The rotor 105' is designed to receive and hold the bottles B for filling at a plurality of filling positions 113 located about the periphery of the rotor 105'. At each of the filling positions 103 is located a filling arrangement 114 having at least one filling device, element, apparatus, or valve. The filling arrangements 114 are designed to introduce a predetermined volume or amount of liquid beverage into the interior of the bottles B to a predetermined or desired level.

The filling arrangements 114 receive the liquid beverage material from a toroidal or annular vessel 117, in which a supply of liquid beverage material is stored under pressure by a gas. The toroidal vessel 117 is a component, for example, of the revolving rotor 105'. The toroidal vessel 117 can be connected by means of a rotary coupling or a coupling that permits rotation. The toroidal vessel 117 is also connected to at least one external reservoir or supply of liquid beverage material by a conduit or supply line. In the embodiment shown in FIG. 1A, there are two external supply reservoirs 123 and 124, each of which is configured to store either the same liquid beverage product or different products. These reservoirs 123, 124 are connected to the toroidal or annular vessel 117 by corresponding supply lines, conduits, or arrangements 121 and 122. The external supply reservoirs 123, 124 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 114 could be connected by separate connections to each of the two toroidal vessels and have two individually-controllable fluid or control valves, so that in each bottle B, the first product or the second product can be filled by means of an appropriate control of the filling product or fluid valves.

Downstream of the beverage filling machine 105, in the direction of travel of the bottles B, there can be a beverage bottle closing arrangement or closing station 106 which closes or caps the bottles B. The beverage bottle closing arrangement or closing station 106 can be connected by a third conveyer arrangement 107 to a beverage bottle labeling arrangement or labeling station 108. The third conveyor arrangement may be formed, for example, by a plurality of starwheels, or may also include a linear conveyor device.

In the illustrated embodiment, the beverage bottle labeling arrangement or labeling station 108 has at least one labeling unit, device, or module, for applying labels to bottles B. In the embodiment shown, the labeling arrangement 108 is connected by a starwheel conveyer structure to three output conveyer arrangements: a first output conveyer arrangement 109, a second output conveyer arrangement 110, and a third output conveyer arrangement 111, all of which convey filled, closed, and labeled bottles B to different locations.

The first output conveyer arrangement 109, in the embodiment shown, is designed to convey bottles B that are filled with a first type of liquid beverage supplied by, for example, the supply reservoir 123. The second output conveyer arrangement 110, in the embodiment shown, is designed to convey bottles B that are filled with a second type of liquid beverage supplied by, for example, the supply reservoir 124. The third output conveyer arrangement 111, in the embodiment shown, is designed to convey incorrectly labeled bottles B. To further explain, the labeling arrangement 108 can comprise at least one beverage bottle inspection or monitoring device that inspects or monitors the location of labels on the bottles B to determine if the labels have been correctly placed or aligned on the bottles B. The third output conveyer arrangement 111 removes any bottles B which have been incorrectly labeled as determined by the inspecting device.

The beverage bottling plant can be controlled by a central control arrangement 112, which could be, for example, computerized control system that monitors and controls the operation of the various stations and mechanisms of the beverage bottling plant.

The stretch blow molding machine which is designated 1 in general in FIG. 1 is used for the manufacture of bottles 2 made of thermoplastic plastic, for example PET bottles, from preforms 3. For this purpose, the stretch blow molding machine 1 includes a furnace or a heating station 4 in which the preforms 3 are heated until they are at the temperature required for the subsequent stretch blowing, for example a temperature of approximately 135° C., and a blowing station 5 with a rotor or blow molding unit 6 that is driven so that it rotates around a vertical machine axis, on the periphery of which rotor or blow molding unit a plurality of blow molds 6.1 are provided, in each of which a preform 3 is molded by blowing into a bottle 2.

To describe the process in detail, during the normal operation of the stretch blow molding machine 1, the preforms are continuously fed by a feeder unit 7 via a conveyor line or feed line 8 as illustrated by Arrow A in FIG. 1. The feeder unit 7 has, among other things, a receiving container in which the preforms 3 are received in an unorganized group and from which the preforms 3 are each transferred to the feeder 8 in a specified orientation. In the feeder 8, the preforms 3 are held in a suspended position in a guide rail, for example on a projecting flange area 3.1, and are moved by compressed air in the direction of conveying or transport A, and specifically to an input 9 of the heating station 4. From the input 9, the preforms 3 travel to a transport element 4.1, with which they are each moved, one after another, through the heating station 4 to an output or transfer conveyor 10. This transfer conveyor 10 has, for example, at least one transport star wheel that is driven in rotation or a corresponding transport wheel for the heated preforms 3 and is realized with a switching function. The transport element 4.1 can be, for example, an endless circulating chain conveyor, on which receptacles for the preforms 3 are provided at a specified machine interval. The preforms 3 can be heated in the heating station 4 by radiant infrared heaters, for example.

Adjacent to the transfer conveyor 10 is an inlet or transport star wheel 11 of the blowing station 5, which star wheel 11 is driven in rotation. During normal operation, the heated preforms 3 are each transferred by means of this transport star wheel 11 one after another to a blow mold 6.1 of the blow molding unit 6 which is driven in rotation. The bottles 2 that are manufactured leave the blowing station 5 or the stretch blow molding machine 1 via an outlet star wheel and a downstream transport line 13, on which the bottles 2 are held suspended in a guide rail with a flange 2.1 formed by the flange segment 3.1 and the respective bottle mouth, and are transported by compressed air in the transport direction B to a downstream machine (not shown), e.g. to a filling machine.

To minimize the waste of material in the event of a problem in the operation of the downstream machine and to prepare bottles 2 for continued use after the resolution of a problem as soon as possible without any delay at the outlet of the stretch mold blowing machine 1, i.e. at the outlet star wheel 12 located at that point, in the exemplary embodiment illustrated in FIG. 1, the transfer conveyor 10 is realized so that in the event of a problem in the downstream machine and/or in the event of a backup of bottles in the transport line 13 caused by such a problem, it stops the onward transfer of the heated preforms 3 to the blow molding station 5 by means of a control device 14, and while the heating station 4 is still in operation—which continues to be loaded with preforms even in the event of the problem described above—continuously transfers the heated preforms outward and forwards them to a buffer storage device 15. This buffer storage device 15 is in the simplest case formed by a collecting containers container. The preforms 3 collected there can then be introduced into the feeder unit 7 or into the receptacle container located there for reuse. Between the transfer conveyor 10 and the buffer storage device 15, there can be a cooling line, for example, so that the outward-transferred preforms 3 can be cooled and therefore reach the buffer 15 or collecting container without the danger of deformation.

The advantage of the stretch blow molding machine 1 is that in the event of a problem in the downstream machine, only the blow molds 6.1 run empty and the bottles that are thereby produced must be outwardly transferred, for example, as well as the fact that the heating station 4 and the transport element 4.1 located there continue to be fully loaded with preforms 3, so that after the problem has been solved, the blowing station 5 is again supplied with heated preforms 3 via the transfer conveyor 10 and the inlet star wheel 11 without any delay.

Figure 2:
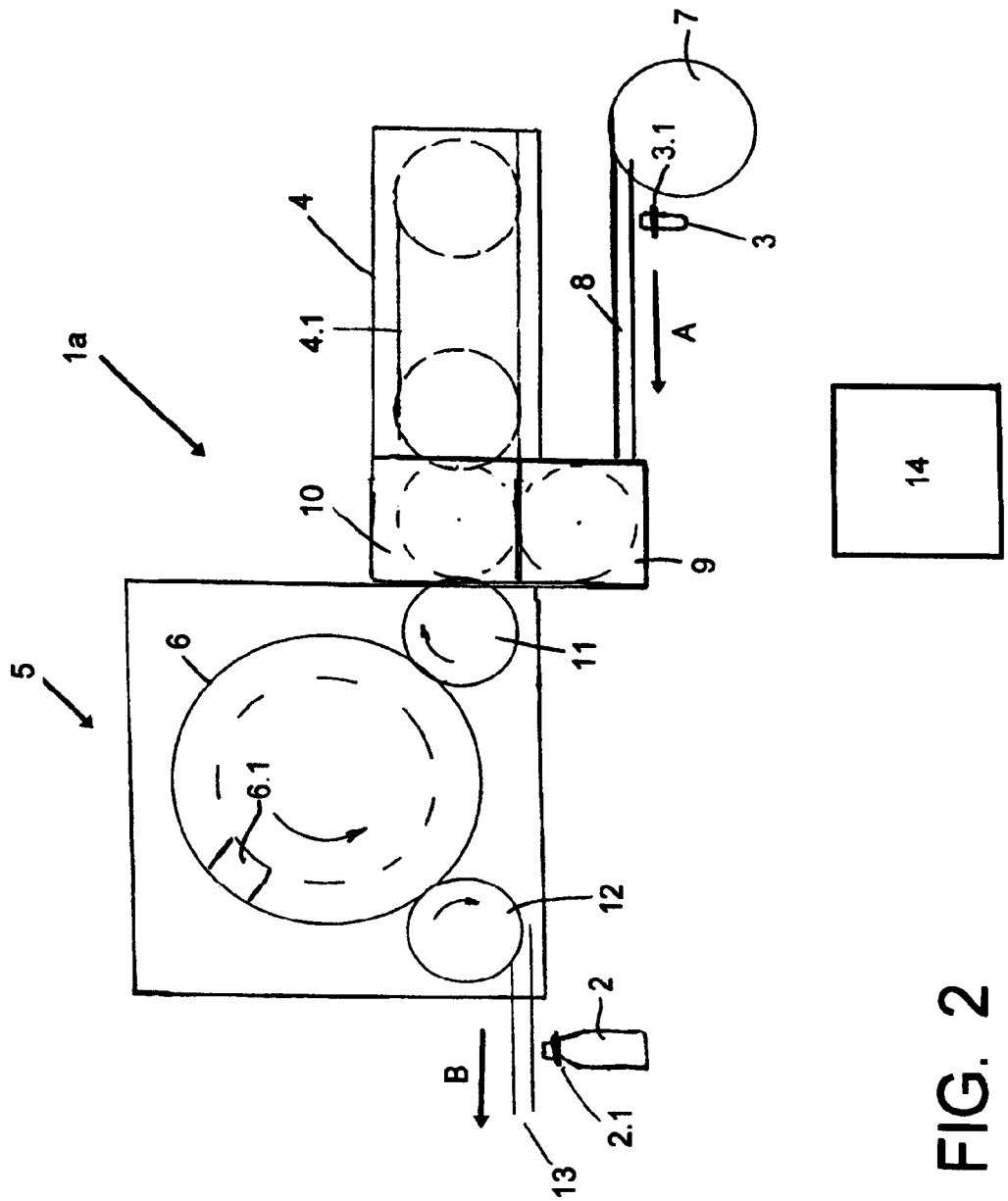
FIG. 2 shows in a simplified schematic view at least one other embodiment of a stretch blow machine for the manufacture of plastic bottles from preforms by stretch blowing.

FIG. 2 is a schematic illustration showing a stretch blow molding machine 1a which differs from the stretch blow molding machine 1 essentially in that, in the event of a problem with the downstream machine, for example with the downstream filling machine, and/or in the case of a bottle backup in the conveyor 13, the feed of the preforms to the heating station 4 is stopped in a controlled manner by the control device 14, and simultaneously the transfer conveyor 10 interrupts the forwarding of the heated preforms 3 to the blowing station 5, so that the preforms 3 that are located in the heating station 4 circulate in the heating station 4 until the problem with the transport element 4.1 is resolved. To thereby prevent an overheating of the preforms 3, the heat output of the heating station 4 is reduced and/or the transport line on which the preforms 3 are moved through the heating station 4, is at least partly cooled with cooling air. The reduction of the heat output and/or the cooling of the conveyor line with cooling air are done, however, so that at least after the elimination of a problem, the preforms 3 that, during their circulation in the heating station 4, reach the transfer conveyor 10, are at the temperature required for the stretch blow molding. When a problem is eliminated, therefore the blow molding of the bottles 2 can be resumed without any delay.

Both on the stretch blow molding machine 1 and on the stretch blow molding machine 1a, in the event of a problem the blowing station 5 is run empty and the bottles 1 that are thereby produced are then ejected, for example. During the problem and hold time, however, the nominal or working temperature of the blow molds 6.1 is maintained.

At least one possible embodiment of the present application is explained herein on the basis of exemplary embodiments. It goes without saying that numerous modifications and variants are possible without thereby going beyond the teaching of at least one possible embodiment of the present application. It is possible, for example, to realize the stretch blow molding machine 1 so that the preforms 3 that are outwardly transferred in the event of a problem at the transfer 10 are transported forward for reuse via a buffer storage device and via a transport system to the feeder unit 7 and/or to a second input of the input 9, which is realized in the form of a merge point.

It is also possible on the stretch blow molding machine 1 to reduce the heat output of the heating station during a problem and/or to cool the transport line on which the preforms 3 are moved through the heating station 4 with cooling air.

In the event of a problem it is also possible to outwardly transfer any preforms that are already inside the heating device 4 in at least one position of the conveyor line located inside the heating station 4. This process is generally advantageous, because certain types of preforms, depending on the material and geometric configuration, exhibit an undesirable crystallization behavior above a certain temperature. Because such a crystallization process begins only when a certain limit temperature is exceeded, such crystallization can be reliably prevented by outwardly transferring the preform at a point of the heating station or at such a time from the heating station 4 at which the preforms are still at a temperature that is below the limit temperature.

In the context of present application, the term "limit temperature" means not only the temperature at which the crystallization begins, but also the temperature at which the crystallization rate or the degree of crystallization of the preform reaches undesirable values.

Figure 3:
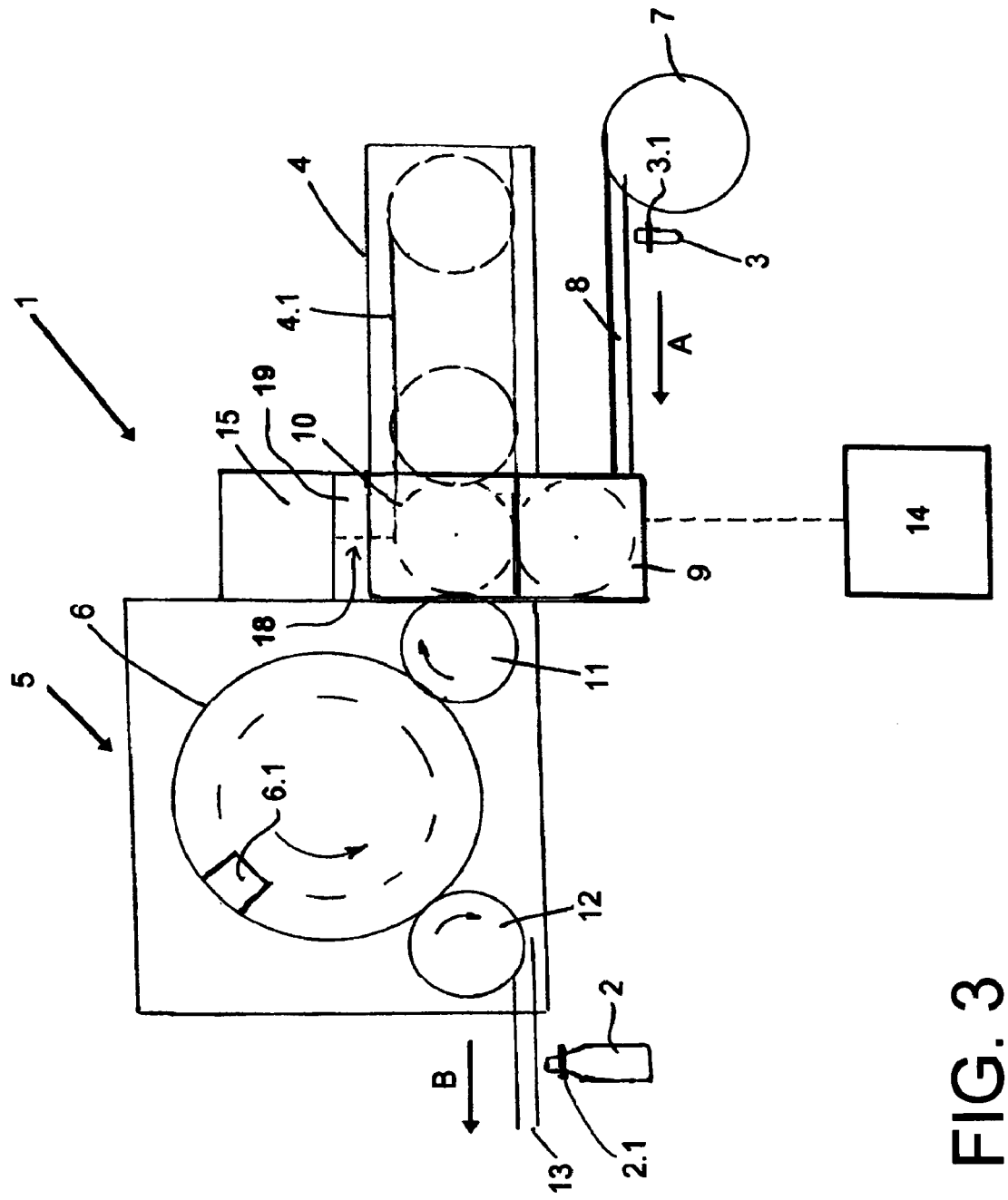
FIG. 3 shows another possible embodiment of the present application.

FIG. 3 shows another possible embodiment of the present application. This embodiment is similar to the one shown in FIG. 1. In the embodiment shown in FIG. 3, the stretch blow molding machine 1 is similar to that shown in FIG. 1 with additional optional features. In FIG. 3, the control device 14 is operatively connected to the stretch blow molding machine 1. In at least one embodiment, the control device 14 is a computer control device that is operatively connected to at least one or more components or machines of the stretch blow molding machine 1, or other components or machines in the overall beverage bottling plant, such as the plant in FIG. 1A, to monitor and/or control the operation of such components or machines. The control device 14, in at least one other possible embodiment, could be part of or work in conjunction with another control device or system, such as the central control arrangement 112 in FIG. 1A. The transfer conveyor 10, according to one possible embodiment, is designed with a switching function, that is, the transfer conveyor 10 can be actuated to switch between conveying preforms 3 to the blowing station 5 and to the buffer or collecting container 15. This switching can be actuated by the control device 14 upon the development of a problem in the operation of the downstream machine and to prepare bottles 2 for continued use after the resolution of a problem as soon as possible with minimal delay. The collecting container 15 in the embodiment shown in FIG. 3 has an output arrangement 18 and a cooling arrangement 19. In operation, preforms 3 could be conveyed from the transfer conveyor 10 to the storage arrangement 15 via the output arrangement 18, which output arrangement 18 has a linear or rotary conveyor arrangement, or a combination thereof. The output arrangement 18, in at least one possible embodiment, can also have a movable transfer arm or other guiding arrangement. The guiding arrangement can be actuated by a signal from the control device 14 during an interruption in the downstream bottling process to divert the preforms 3 out of the conveyor 10 and to the storage arrangement 15. When the interruption has been corrected or overcome, the guiding arrangement can be taken out of engagement with the conveyor 10 to permit the preforms 3 to continue on their normal path to the inlet star wheel 11. Upon removal of the preforms 3 from the conveyor 10, the preforms 3 are collected in the storage arrangement 15 and then can be taken to the feeder unit 7 or placed into a receptacle container located by the feeder unit for reuse. In one possible embodiment, the storage arrangement 15 has a removable container that can be removed when it is substantially filled with preforms 3. The container could then be taken, either manually or by mechanical means, such as a forklift, to the feeder unit 7 or to a storage area where the supply of preforms 3 is stored. While the full container is being transported, an empty container could be placed in the storage arrangement 15 to collect preforms 3 during an interruption in the bottling process. In addition, between the transfer conveyor 10 and the buffer storage device 15, there can be a cooling arrangement 19, for example, so that the outward-transferred preforms 3 can be cooled and therefore reach the buffer 15 or collecting container without the danger of deformation. The cooling arrangement 19 could have blowers or other cooling elements to cool the heated preforms 3 prior to their placement in the storage device 15.

Figure 4:
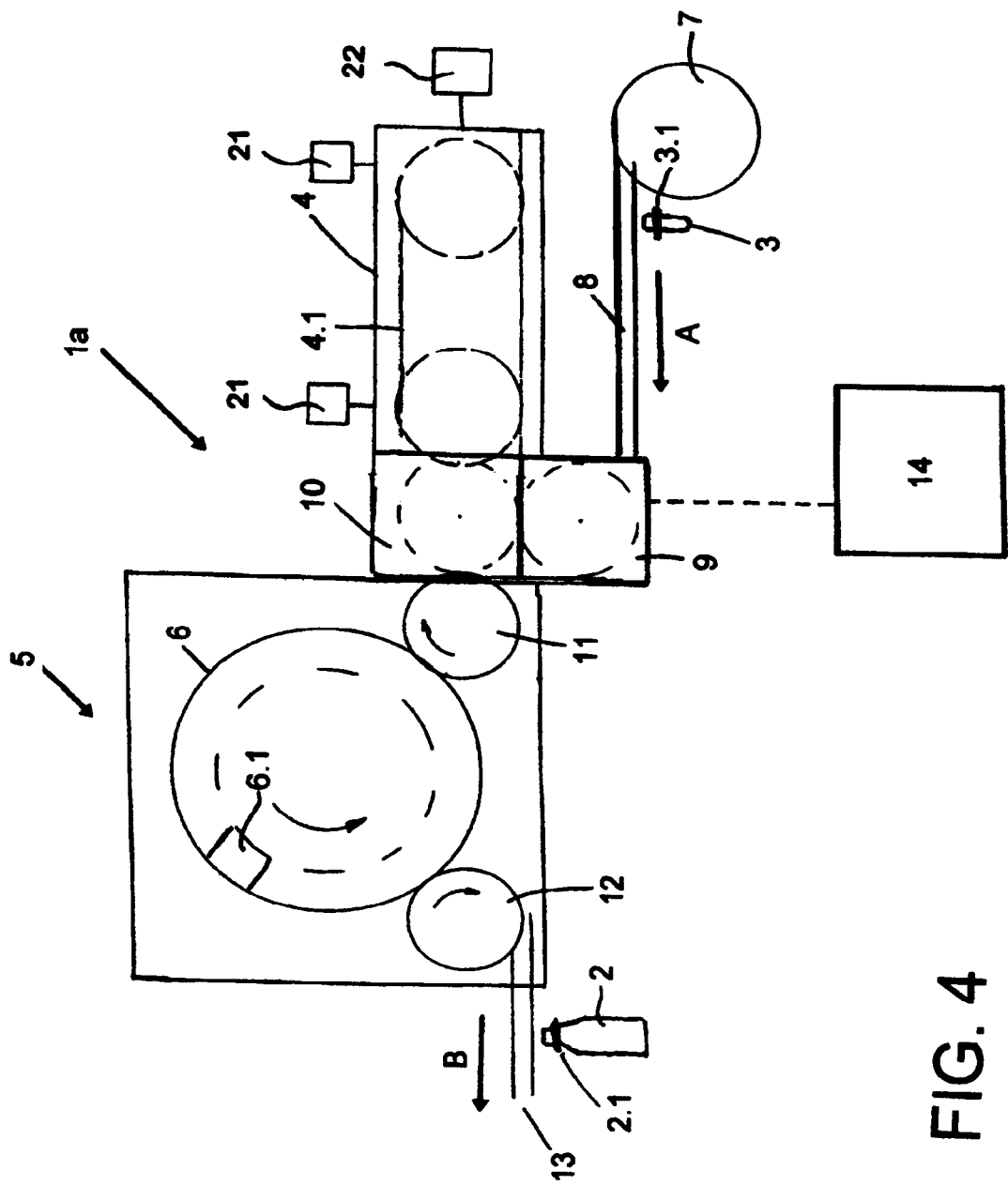
FIG. 4 shows a further possible embodiment of the present application.

FIG. 4 shows another possible embodiment of the present application. This embodiment is similar to the one shown in FIG. 2. In the embodiment shown in FIG. 4, the stretch blow molding machine 1 is similar to that shown in FIG. 2 with additional features. The heating station 4 has at least one heater 21 and at least one cooling device 22. The heater 21 heats the preforms and the cooling device 22 helps maintain the temperature of the preforms 3 to avoid overheating during an interruption downstream in the bottling process.

At least one possible embodiment of the present application relates to a stretch blow mold machine for the manufacture of hollow bodies, generally bottles, by stretch blowing using preforms made of thermoplastic plastic, with a preheating station for the preheating of the preforms fed to this station and with a blowing station that has at least one blow mold.

This application also relates to a stretch blow molding machine and method for the manufacture of bottles or similar hollow bodies.

One feature or aspect of an embodiment is believed at the time of the filing of this patent application to possibly reside broadly in a stretch blow molding machine for the manufacture of hollow bodies, generally bottles 2, by stretch blowing with the use of preforms 3 made of thermoplastic plastic, with a heating station 4 for the preheating of the preforms 3 that are fed to this station, and with a blowing station 5 that has at least one blow mold 6.1, to which the preforms 3 heated in the heating station 4 are fed, characterized by means 10 which, in the event of a problem in the blowing station 5 and or in a part of the plant that processes the hollow bodies downstream of the blowing machine, outwardly transfers at least some of the heated preforms 3 while the heating station 4 remains in operation.

Another feature or aspect of an embodiment is believed at the time of the filing of this patent application to possibly reside broadly in the stretch blow molding machine, characterized by means 9, 10 that, in the event of a problem in the blowing station 5 and/or in a part of the plant that processes the hollow bodies downstream of the blowing machine, as the heating station 4 continues to operate, block the feed of the preforms 3 to the heating station 4 and the transfer of preforms 3 from the heating station 4 to the blowing station 5.

Yet another feature or aspect of an embodiment is believed at the time of the filing of this patent application to possibly reside broadly in a stretch blow molding machine for the manufacture of hollow bodies, generally bottles 2, by stretch blowing using preforms 3 made of thermoplastic plastic with a heating station 4 for the preheating of the preforms 3 that are fed to this station, as well as with a blowing station 5 that has at least one blow mold 6.1, to which blowing station the preforms 3 heated in the heating station 4 are fed, characterized by means 9, 10 that in the event of a problem in the blowing station 5 and/or in a part of a plant that processes the hollow bodies downstream of the blowing machine, as the heating station 4 remains in operation, block the feed of the preforms 3 to the heating station 4 and the transfer of preforms 3 from the heating station 4 to the blower station 5.

Still another feature or aspect of an embodiment is believed at the time of the filing of this patent application to possibly reside broadly in the stretch blow molding machine, characterized by means 10 which, in the event of a problem in the blowing station 5 and/or in a part of the plant that processes the hollow bodies downstream of the blowing machine, as the heating station 4 continues to operate, effect an outward transfer of at least some of the heated preforms 3.

A further feature or aspect of an embodiment is believed at the time of the filing of this patent application to possibly reside broadly in the stretch blow molding machine, characterized by a transfer conveyor 10 located between an outlet of the heating station 4 and an inlet of the blowing station 5, which can be controlled so that in the event of a problem it interrupts the forward transport of the heated preforms 3 to the blowing station 5.

Another feature or aspect of an embodiment is believed at the time of the filing of this patent application to possibly reside broadly in the stretch blow molding machine, characterized in that the transfer conveyor 10 outwardly transfers the heated preforms 3, for example to a buffer 15 or collecting container.

Yet another feature or aspect of an embodiment is believed at the time of the filing of this patent application to possibly reside broadly in the stretch blow molding machine, characterized in that in the event of a problem, the transfer conveyor 10 blocks the heating station 4 for the delivery of the preforms 3 to the blowing station 5.

Still another feature or aspect of an embodiment is believed at the time of the filing of this patent application to possibly reside broadly in the stretch blow molding machine, characterized in that the heating station 4 has at least one driven endless circulating transport element 4.1 for the preforms 3.

A further feature or aspect of an embodiment is believed at the time of the filing of this patent application to possibly reside broadly in the stretch blow molding machine, characterized in that the blowing station 5 has at least one rotor 6 that can be driven in rotation around a vertical machine axis with a plurality of blow molds 6 that are provided on the rotor periphery.

Another feature or aspect of an embodiment is believed at the time of the filing of this patent application to possibly reside broadly in the stretch blow molding machine, characterized in that it is interlocked with a downstream machine, generally with a downstream filling machine.

Yet another feature or aspect of an embodiment is believed at the time of the filing of this patent application to possibly reside broadly in a method for the manufacture of bottles 2 or similar hollow bodies by stretch blow molding using preforms 3 made of thermoplastic plastic, whereby the preforms 3 are heated in a heating station 4 and are deformed in the heated state in a blow mold 6.1 of a blowing station 5 into the individual hollow bodies, characterized in that in the event of a problem in the blowing station 5 and/or in a part of the plant that processes the hollow bodies downstream of the stretch blow molding machine 1, 1a, the onward transfer of the heated preforms 3 to the blowing station is interrupted and at least some of the preforms 3 are transferred outward for reuse.

Still another feature or aspect of an embodiment is believed at the time of the filing of this patent application to possibly reside broadly in the method, characterized in that in the event of a problem, at least some of the preforms 3 are retained in the heating station 4 or are moved into a self-contained holding loop inside the heating station 4.

A further feature or aspect of an embodiment is believed at the time of the filing of this patent application to possibly reside broadly in the method for the manufacture of bottles 2 or similar hollow containers by blow molds using preforms 3 made of thermoplastic plastic, whereby the preforms 3 are heated in a heating station 4 and in the heated state are deformed in a blow mold 6.1 of a blowing station 5 into the individual hollow bodies, characterized in that in the event of a problem, at least some of the preforms 3 are retained in the heating station 4 or are moved into a self-contained holding loop inside the heating station 4.

Another feature or aspect of an embodiment is believed at the time of the filing of this patent application to possibly reside broadly in the method, characterized in that in the event of a problem in the blowing station 5 and/or in a portion of the plant that processes the hollow bodies downstream of the stretch blow molding machine 1, 1a, the onward transfer of the heated preforms 3 to the blowing station is interrupted and at least some of the preforms 3 are transferred outward for reuse.

Yet another feature or aspect of an embodiment is believed at the time of the filing of this patent application to possibly reside broadly in the method, characterized in that the preforms 3 are transferred outward to a buffer storage device 15 or to a receiving or collecting container.

Still another feature or aspect of an embodiment is believed at the time of the filing of this patent application to possibly reside broadly in the method, characterized in that in the event of a problem, the preforms 3 are moved on at least one endless circulating driven transport element 4.1 of the heating station 4.

A further feature or aspect of an embodiment is believed at the time of the filing of this patent application to possibly reside broadly in the method, characterized in that in the event of a problem, the heat output of the heating station 4 is reduced and/or that the transport line on which the preforms 3 are moved through the heating station is cooled with cooling air.

Another feature or aspect of an embodiment is believed at the time of the filing of this patent application to possibly reside broadly in the method, characterized in that in the event of a problem, the blowing station 5 is run empty and as long as the problems persist or during the hold time until the problem is resolved, the at least one blow mold 6.1 is held at the nominal and operating temperature.

The components disclosed in the various publications, disclosed or incorporated by reference herein, may possibly be used in possible embodiments of the present invention, as well as equivalents thereof.

Some examples of bottling and container handling systems and components thereof which may possibly be utilized or adapted for use in at least one possible embodiment, may possibly be found in the following U.S. Pat. No. 6,484,477, entitled "Capping Machine for Capping and Closing Containers, and a Method for Closing Containers;" U.S. Pat. No. 6,474,368, entitled "Beverage Container Filling Machine, and Method for Filling Containers with a Liquid Filling Material in a Beverage Container Filling Machine;" U.S. Pat. No. 6,494,238, entitled "A Plant for Filling Beverage into Beverage Bottles Other Beverage Containers Having Apparatus for Replacing Remaining Air Volume in Filled Beverage Bottles or Other Beverage Containers;" U.S. Pat. No. 6,470,922, entitled "Apparatus for the Recovery of an Inert Gas;" U.S. Pat. No. 6,463,964, entitled "Method of Operating a Plant for Filling Bottles, Cans or the like Beverage Containers with a Beverage, and a Beverage Container Filling Machine;" U.S. Pat. No. 6,834,473, entitled "Bottling Plant and Method of Operating a Bottling Plant and a Bottling Plant with Sections for Stabilizing the Bottled Product;" U.S. Pat. No. 6,484,762, entitled "A Filling System with Post-dripping Prevention;" U.S. Pat. No. 6,668,877, entitled "Filling System for Still Beverages;" U.S. Pat. No. 7,024,841, entitled "Labeling Machine with a Sleeve Mechanism for Preparing and Applying Cylindrical Labels onto Beverage Bottles and Other Beverage Containers in a Beverage Container Filling Plant;" U.S. Pat. No. 6,971,219 entitled "Beverage bottling plant for filling bottles with a liquid beverage filling material and a labelling station for labelling filled bottles and other containers;" U.S. Pat. No. 6,973,767, entitled "Beverage bottling plant and a conveyor arrangement for transporting packages;" U.S. Pat. No. 7,013,624, entitled "Beverage bottling plant for filling bottles with a liquid beverage filling material, a container filling plant container information adding station, such as, a labeling station, configured to add information to containers, such as, bottles and cans, and modules for labeling stations;" U.S. Pat. No. 7,108,025, entitled "Beverage Bottling Plant for Filling Bottles with a Liquid Beverage Filling Material, and a Container Filling Lifting Device for Pressing Containers to Container Filling Machines;" U.S. Pat. No. 7,062,894, entitled "Beverage Bottling Plant for Filling Bottles with a Liquid Beverage Filling Material, and a Container Filling Plant Container Information Adding Station, Such As, a Labeling Station Having a Sleeve Label Cutting Arrangement, Configured to Add Information to Containers, Such As, Bottles and Cans;" U.S. Pat. No. 7,010,900, entitled "Beverage Bottling Plant for Filling Bottles with a Liquid Beverage Filling Material, and a Cleaning Device for Cleaning Bottles in a Beverage Bottling Plant;" U.S. Pat. No. 6,918,417, entitled "A Beverage Bottling Plant for Filling Bottles with a Liquid Beverage Filling Material, and an Easily Cleaned Lifting Device in a Beverage Bottling Plant;" U.S. Pat. No. 7,065,938, entitled "A Beverage Bottling Plant for Filling Bottles with a Liquid Beverage Filling Material, and a Container Filling Plant Container Information Adding Station, Such As, a Labeling Station Having a Gripper Arrangement, Configured to Add Information to Containers, Such As, Bottles and Cans;" U.S. Pat. No. 6,901,720, entitled "A Beverage Bottling Plant for Filling Bottles with a Liquid Beverage Filling Material, and Apparatus for Attaching Carrying Grips to Containers with Filled Bottles;" and U.S. Pat. No. 7,121,062 "Beverage bottling plant for filling bottles with a liquid beverage filling material, having a container handling machine with interchangeable receptacles for the container mouth."

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

Some examples of bottling and container handling systems and components thereof which may possibly be utilized or adapted for use in at least one possible embodiment, may possibly be found in the following U.S. patent applications: Ser. No. 10/723,451, filed on Nov. 26, 2003, entitled "Beverage Bottling Plant for Filling Beverage Bottles or Other Beverage Containers with a Liquid Beverage Filling Material and Arrangement for Dividing and Separating of a Stream of Beverage Bottles or Other Beverage Containers;" Ser. No. 10/739,895, filed on Dec. 18, 2003, entitled "Method of Operating a Beverage Container Filling Plant with a Labeling Machine for Labeling Beverage Containers Such as Bottles and Cans, and a Beverage Container Filling Plant with a Labeling Machine for Labeling Beverage Containers Such as Bottles and Cans;" Ser. No. 10/865,240, filed on Jun. 10, 2004, Entitled "A Beverage Bottling Plant for Filling Bottles with a Liquid Beverage Filling Material, a Beverage Container Filling Machine, and a Beverage Container Closing Machine;" Ser. No. 10/883,591, filed on Jul. 1, 2004, entitled "A Beverage Bottling Plant for Filling Bottles with a Liquid Beverage Filling Material Having a Container Filling Plant Container Information Adding Station, Such As, a Labeling Station, Configured to Add Information to Containers, Such As, Bottles and Cans, and Modules for Labeling Stations and a Bottling Plant Having a Mobile Module Carrier;" Ser. No. 10/930,678, filed on Aug. 31, 2004, entitled "A Beverage Bottling Plant for Filling Bottles with a Liquid Beverage Filling Material, a Container Filling Plant Container Filling Machine, and a Filter Apparatus for Filtering a Liquid Beverage;" Ser. No. 10/931,817, filed on Sep. 1, 2004, entitled "A Beverage Bottling Plant for Filling Bottles with a Liquid Beverage Filling Material, Having an Apparatus for Exchanging Operating Units Disposed at Rotating Container Handling Machines;" No. 10/954,012, filed on Sep. 29, 2004, Ser. No. 10/952,706, Ser. No. 10/962,183, filed on Oct. 8, 2004, Ser. No. 10/967,016, filed on Oct. 15, 2004, Ser. No. 10/982,706, filed on Nov. 5, 2004, Ser. No. 10/982,694, Ser. No. 10/982,710, Ser. No. 10/984,677, filed on Nov. 9, 2004, having Ser. No. 10/985,640, filed on Nov. 10, 2004, Ser. No. 11/004,663, filed on Dec. 3, 2004, Ser. No. 11/009,551, filed on Dec. 10, 2004, Ser. No. 11/012,859, filed on Dec. 15, 2004, Ser. No. 11/014,673, filed on Dec. 16, 2004, Ser. No. 11/016, 364, filed on Dec. 17, 2004, and Ser. No. 11/016,363.

The appended drawings in their entirety, including all dimensions, proportions and/or shapes in at least one embodiment of the invention, are accurate and are hereby included by reference into this specification.

Some examples of bottling systems, which may be used or adapted for use in at least one possible embodiment of the present may be found in the following U.S. patents assigned to the Assignee herein, namely: U.S. Pat. No. 4,911,285; U.S. Pat. No. 4,944,830; U.S. Pat. No. 4,950,350; U.S. Pat. No. 4,976,803; U.S. Pat. No. 4,981,547; U.S. Pat. No. 5,004,518; U.S. Pat. No. 5,017,261; U.S. Pat. No. 5,062,917; U.S. Pat. No. 5,062,918; U.S. Pat. No. 5,075,123; U.S. Pat. No. 5,078, 826; U.S. Pat. No. 5,087,317; U.S. Pat. No. 5,110,402; U.S. Pat. No. 5,129,984; U.S. Pat. No. 5,167,755; No. 5,174,851; U.S. Pat. No. 5,185,053; U.S. Pat. No. 5,217,538; U.S. Pat. No. 5,227,005; U.S. Pat. No. 5,413,153; U.S. Pat. No. 5,558, 138; U.S. Pat. No. 5,634,500; U.S. Pat. No. 5,713,403; U.S. Pat. No. 6,276,113; U.S. Pat. No. 6,213,169; U.S. Pat. No. 6,189,578; U.S. Pat. No. 6,192,946; U.S. Pat. No. 6,374,575; U.S. Pat. No. 6,365,054; U.S. Pat. No. 6,619,016; U.S. Pat. No. 6,474,368; U.S. Pat. No. 6,494,238; U.S. Pat. No. 6,470, 922; and U.S. Pat. No. 6,463,964.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

Some examples of control systems which measure operating parameters and learn therefrom that may possibly be utilized or possibly adapted for use in at least one possible embodiment of the present application may possibly be found in the following U.S. Pat. No. 4,655,188 issued to Tomisawa et al. on Apr. 7, 1987; U.S. Pat. No. 5,191,272 issued to Torii et al. on Mar. 2, 1993; U.S. Pat. No. 5,223,820, issued to Sutterlin et al. on Jun. 29, 1993; and U.S. Pat. No. 5,770,934 issued to Theile on Jun. 23, 1998.

All, or substantially all, of the components and methods of the various embodiments may be used with at least one embodiment or all of the embodiments, if more than one embodiment is described herein.

Some examples of interface arrangements that may possibly be utilized or possibly adapted for use in at least one possible embodiment of the present application may possibly be found in the following U.S. Pat. No. 5,001,704 issued to Narup et al. on Mar. 19, 1991; U.S. Pat. No. 5,961,356 issued to Fekete on Oct. 5, 1999; U.S. Pat. No. 6,621,692 issued to Johnson et al. on Sep. 16, 2003; U.S. Pat. No. 6,661,961 issued to Allen et al. on Dec. 9, 2003; U.S. Pat. No. 6,687,166 issued to Takahashi et al. on Feb. 3, 2004; and U.S. Pat. No. 6,687,779 issued to Sturm et al. on Feb. 3, 2004.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

Some examples of computer systems that may possibly be utilized or possibly adapted for use in at least one possible embodiment of the present application may possibly be found in the following U.S. Pat. No. 5,416,480 issued to Roach et al. on May 16, 1995; U.S. Pat. No. 5,479,355 issued to Hyduke on Dec. 26, 1995; U.S. Pat. No. 5,481,730 issued to Brown et al. on Jan. 2, 1996; U.S. Pat. No. 5,805,094 issued to Roach et al. on Sep. 8, 1998; U.S. Pat. No. 5,881,227 issued to Atkinson et al. on Mar. 9, 1999; and U.S. Pat. No. 6,072,462 issued to Moshovich on Jun. 6, 2000.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

Some examples of bottling systems which may possibly be utilized or adapted for use in at least one possible embodiment may possibly be found in the following U.S. Pat. No. 6,684,602, entitled "Compact bottling machine;" U.S. Pat. No. 6,470,922, entitled "Bottling plant for bottling carbonated beverages;" U.S. Pat. No. 6,390,150, entitled "Drive for bottling machine;" U.S. Pat. No. 6,374,575, entitled "Bottling plant and method of operating a bottling plant;" U.S. Pat. No. 6,192,946, entitled "Bottling system;" U.S. Pat. No. 6,185,910, entitled "Method and an apparatus for high-purity bottling of beverages;" U.S. Pat. No. 6,058,985, entitled "Bottling machine with a set-up table and a set-up table for a bottling machine and a set-up table for a bottle handling machine;" U.S. Pat. No. 5,996,322, entitled "In-line bottling plant;" U.S. Pat. No. 5,896,899, entitled "Method and an apparatus for sterile bottling of beverages;" U.S. Pat. No. 5,848,515, entitled "Continuous-cycle sterile bottling plant;" U.S. Pat. No. 5,634,500, entitled "Method for bottling a liquid in bottles or similar containers;" and U.S. Pat. No. 5,425,402, entitled "Bottling system with mass filling and capping arrays."

Some examples of bottle or container molding or manufacturing systems, and components thereof, which may possibly be utilized or adapted for use in at least one possible embodiment may possibly be found in the following U.S. Pat. No. 7,157,040, entitled "Helical blow molding preform and method of manufacturing;" U.S. Pat. No. 7,153,127, entitled "Method and apparatus for blow molding hollow plastic containers;" U.S. Pat. No. 7,147,456, entitled "Mold device having a combination of molds for stretch blow molding;" U.S. Pat. No. 7,131,830, entitled "Blow molding machine;" U.S. Pat. No. 7,129,317, entitled "Slow-crystallizing polyester resins;" U.S. Pat. No. 7,118,005, entitled "Individual bottle coolers;" U.S. Pat. No. 7,115,309, entitled "Synthetic resin preform to be biaxially stretched and blow molded into a bottle;" U.S. Pat. No. 7,114,945, entitled "Blow mold device;" U.S. Pat. No. 7,101,506, entitled "Takeout and transfer apparatus and method for a wheel blow molding machine;" U.S. Pat. No. 7,101,170, entitled "Take-out device for rotary blow molding machine;" U.S. Pat. No. 7,097,060, entitled "Container with non-everting handgrip;" U.S. Pat. No. 7,094,863, entitled "Polyester preforms useful for enhanced heat-set bottles;" U.S. Pat. No. 7,093,411, entitled "Method for storing thermoplastic preforms in a container;" U.S. Pat. No. 7,083,407, entitled "Preform holding jig for biaxial orientation blow molding;" U.S. Pat. No. 7,081,285, entitled "Polyethylene useful for blown films and blow molding;" U.S. Pat. No. 7,033,162, entitled "Injection blow molding device;" U.S. Pat. No. 7,001,172, entitled "Clamping device for injection blow or injection stretch blow molding machine;" U.S. Pat. No. 6,971,864, entitled "Device for producing plastic hollow bodies using an extrusion blow molding method;" U.S. Pat. No. 6,888,103, entitled "Preform preheater;" U.S. Pat. No. 6,851,944, entitled "Mold tool clamping device for blow mold machines;" U.S. Pat. No. 6,848,900, entitled "Apparatus for handling injection molded preforms;" U.S. Pat. No. 6,848,899, entitled "Injection stretch blow molding device with transfer station and pitch changing for blow molding;" U.S. Pat. No. 6,848,896, entitled "Height adjusting device for adjusting the height of a blow mandrel;" U.S. Pat. No. 6,843,646, entitled "Nickel blow mold and holder defining heat transfer passages therebetween;" U.S. Pat. No. 6,839,652, entitled "Method and device for predicting temperature profiles throughout the thickness of a polymer preform;" U.S. Pat. No. 6,820,396, entitled "Method for storing thermoplastic preforms in a container;" and U.S. Pat. No. 6,814,922, entitled "Method and device for production of a blown container."

All of the patents, patent applications or patent publications, which were cited in the German Office Action dated Nov. 10, 2006, and/or cited elsewhere are hereby incorporated by reference as if set forth in their entirety herein as follows: German Patent No. 695 27 216 T2, German Patent No. 696 01 495 T2, and German Patent No. 198 24 846 A1.

The corresponding foreign and international patent publication applications, namely, Federal Republic of Germany Patent Application No. 10 2006 013 843, filed on Mar. 25, 2006, having inventor Volker TILL, and DE-OS 10 2006 013 843 and DE-PS 10 2006 013 843, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

Some examples of cooling arrangements that may possibly be utilized or possibly adapted for use in at least one possible embodiment of the present application may possibly be found in the following U.S. Pat. No. 5,331,884 issued to Ando on Jul. 26, 1994; U.S. Pat. No. 6,553,766 issued to Shimizu et al. on Apr. 29, 2003; U.S. Pat. No. 6,585,095 issued to Savoyard et al. on Jul. 1, 2003; U.S. Pat. No. 6,609,884 issued to Harvey on Aug. 26, 2003; U.S. Pat. No. 6,638,123 issued to Kinomoto on Oct. 28, 2003; and U.S. Pat. No. 6,698,496 issued to Takayama et al. on Mar. 2, 2004.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

Some examples of heater arrangements that may possibly be utilized or possibly adapted for use in at least one possible embodiment of the present application may possibly be found in the following U.S. Pat. No. 6,404,421 issued to Meijler et al. on Jun. 11, 2002; U.S. Pat. No. 6,515,264 issued to Toya et al. on Feb. 4, 2003; U.S. Pat. No. 6,548,786 issued to Takizawa et al. on Apr. 15, 2003; U.S. Pat. No. 6,555,796 issued to Cusack on Apr. 29, 2003; U.S. Pat. No. 6,633,727 issued to Henrie et al. on Oct. 14, 2003; and U.S. Pat. No. 6,677,557 issued to Ito et al. on Jan. 13, 2004.

The details in the patents, patent applications and publications may be considered to be incorporable, at applicant's option, into the claims during prosecution as further limitations in the claims to patentably distinguish any amended claims from any applied prior art.

Some examples of starwheels which may possibly be utilized or adapted for use in at least one possible embodiment may possibly be found in the following U.S. Pat. No. 5,613,593, entitled "Container handling starwheel;" U.S. Pat. No. 5,029,695, entitled "Improved starwheel;" U.S. Pat. No. 4,124,112, entitled "Odd-shaped container indexing starwheel;" and U.S. Pat. No. 4,084,686, entitled "Starwheel control in a system for conveying containers."

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

Some examples of temperature sensors or sensor systems that may be used or adapted for use in at least one possible embodiment of the present invention may be found in the following U.S. Pat. No. 5,960,857, issued to inventors Oswalt et al. on Oct. 5, 1999; U.S. Pat. No. 5,942,980, issued to inventors Hoben et al. on Aug. 24, 1999; U.S. Pat. No. 5,881,952, issued to inventor MacIntyre on Mar. 16, 1999; U.S. Pat. No. 5,862,669, issued to inventors Davis et al. on Jan. 26, 1999; U.S. Pat. No. 5,459,890, issued to inventor Jarocki on Oct. 24, 1995; U.S. Pat. No. 5,367,602, issued to inventor Stewart on Nov. 22, 1994; U.S. Pat. No. 5,319,973, issued to inventors Crayton et al. on Jun. 14, 1994; U.S. Pat. No. 5,226,320, issued to inventors Dages et al. on Jul. 13, 1993; U.S. Pat. No. 5,078,123, issued to inventors Nagashima et al. on Jan. 7, 1992; and U.S. Pat. No. 5,068,030, issued to inventor Chen on Nov. 26, 1991.

Some examples of position sensors or position sensor systems that may be used or adapted for use in at least one possible embodiment of the present invention may be found in the following U.S. Pat. No. 5,794,355, issued to inventor Nickum on Aug. 18, 1998; U.S. Pat. No. 5,520,290, issued to inventors Kumar et al. on May 28, 1996; U.S. Pat. No. 5,074,053, issued to inventor West on Dec. 24, 1991; and U.S. Pat. No. 4,087,012, issued to inventor Fogg on May 2, 1978.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

AT LEAST PARTIAL NOMENCLATURE 1, 1a Stretch blow molding machine
2 Bottle
2.1 Flange
3 Preform
3.1 Flange
4 Heating station
4.1 Transport element
5 Loading station
6 Rotating blow molding unit
6.1 Blow mold
7 Feeder unit
8 Conveyor
9 Input station
10 Transfer conveyor
11 Inlet star
12 Outlet star
13 Conveyor
14 Control device
15 Buffer or collecting container
A Direction of conveyance of the preforms 3
B Direction of conveyance of the bottles 2

What is claimed is:

1. A beverage bottling or container filling plant for filling beverage bottles or containers with liquid beverage material, said beverage bottling or container filling plant comprising:

said beverage bottle or container filling machine being configured and disposed to fill beverage bottles or containers with liquid beverage material;

said beverage bottle or container filling machine comprising a plurality of beverage bottle or container filling elements for filling beverage bottles or containers with liquid beverage material;

each of said plurality of beverage bottle or container filling elements comprising a container carrier being configured and disposed to receive and hold beverage bottles or containers to be filled;

each of said plurality of beverage bottle or container filling elements being configured and disposed to dispense liquid beverage material into beverage bottles or containers to be filled;

a first conveyor arrangement being configured and disposed to convey filled beverage bottles or containers from said beverage bottle or container filling machine to said beverage bottle or container closing machine;

said beverage bottle or container closing machine being configured and disposed to close tops of filled beverage bottles or containers;

said beverage bottle or container closing machine comprising a plurality of closing devices;

each of said plurality of closing devices being configured and disposed to place closures on filled beverage bottles or containers;

each of said plurality of closing devices comprising a container carrier being configured and disposed to receive and hold filled beverage bottles or containers;

a beverage bottle or container handling machine being configured and disposed to form and handle beverage bottles or containers;

said beverage bottle or container handling machine comprising a supply arrangement being configured and disposed to supply unformed beverage bottle or container structures;

said beverage bottle or container handling machine comprising a treatment arrangement being configured and disposed to treat unformed beverage bottle or container structures;

said beverage bottle or container handling machine comprising a forming arrangement being configured and disposed to form treated, unformed beverage bottle or container structures in to beverage bottles or containers;

said beverage bottle or container handling machine comprising a transfer conveyor arrangement being configured and disposed to convey treated, unformed beverage bottle or container structures from said treatment arrangement to said forming arrangement;

said beverage bottle or container handling machine comprising a storage arrangement being configured and disposed to receive treated, unformed beverage bottle or container structures therein upon an interruption in the bottling process due to an error in operation of said forming arrangement, said filling machine, or said closing machine to minimize loss of or damage to unformed beverage bottle or container structures and to maintain operation of said supply arrangement and said treatment arrangement during the interruption;

said transfer conveyor arrangement of said beverage bottle or container handling machine being configured to convey treated, unformed beverage bottle or container structures to said storage arrangement upon an interruption in the bottling process; and a second conveyor arrangement being configured and disposed to convey beverage bottles or containers to be filled from said beverage bottle or container handling machine to said beverage bottle or container filling machine.

2. The beverage bottle or container filling plant according to claim 1, wherein said treatment arrangement comprises a heating arrangement, said forming arrangement, comprises a stretch blow molding machine, and the unformed beverage bottle or container structures comprise beverage bottle or container preforms made of thermoplastic plastic.

3. The beverage bottle or container filling plant according to claim 2, wherein the treatment arrangement has at least one driven endless circulating transport element for the unformed beverage bottle or container structures; and the forming arrangement has at least one rotor that can be driven in rotation around a vertical machine axis with a plurality of forming molds that are provided on the rotor periphery.

4. A beverage bottling or container filling plant for filling beverage bottles or containers with liquid beverage material, said beverage bottling or container filling plant comprising:

said beverage bottle or container filling machine being configured and disposed to fill beverage bottles or containers with liquid beverage material;

said beverage bottle or container filling machine comprising a plurality of beverage bottle or container filling elements for filling beverage bottles or containers with liquid beverage material;

each of said plurality of beverage bottle or container filling elements comprising a container carrier being configured and disposed to receive and hold beverage bottles or containers to be filled;

each of said plurality of beverage bottle or container filling elements being configured and disposed to dispense liquid beverage material into beverage bottles or containers to be filled;

a first conveyor arrangement being configured and disposed to convey filled beverage bottles or containers from said beverage bottle or container filling machine to said beverage bottle or container closing machine;

said beverage bottle or container closing machine being configured and disposed to close tops of filled beverage bottles or containers;

said beverage bottle or container closing machine comprising a plurality of closing devices;

each of said plurality of closing devices being configured and disposed to place closures on filled beverage bottles or containers;

each of said plurality of closing devices comprising a container carrier being configured and disposed to receive and hold filled beverage bottles or containers;

a beverage bottle or container handling machine being configured and disposed to form and handle beverage bottles or containers;

said beverage bottle or container handling machine comprising a supply arrangement being configured and disposed to supply unformed beverage bottle or container structures;

said beverage bottle or container handling machine comprising a treatment arrangement being configured and disposed to treat unformed beverage bottle or container structures;

said beverage bottle or container handling machine comprising a forming arrangement being configured and disposed to form treated, unformed beverage bottle or container structures in to beverage bottles or containers;

said beverage bottle or container handling machine comprising a transfer conveyor arrangement being configured and disposed to convey treated, unformed beverage bottle or container structures from said treatment arrangement to said forming arrangement;

said beverage bottle or container handling machine comprises an input arrangement being configured, to feed unformed beverage bottle or container structures into said treatment arrangement; and upon an interruption in the bottling process due to an error in operation of said forming arrangement, said filling machine, or said closing machine, said input arrangement being configured, as said treatment arrangement continues to operate, to block the feed of the unformed beverage bottle or container structures to said treatment arrangement, and said transfer conveyor being configured to block the transfer of unformed beverage bottle or container structures from said treatment arrangement to said forming arrangement by retaining the unformed beverage bottle or container structures in said treatment arrangement; and a second conveyor arrangement being configured and disposed to convey beverage bottles or containers to be filled from said beverage bottle or container handling machine to said beverage bottle or container filling machine.

5. The beverage bottle or container filling plant according to claim 4, wherein upon another interruption in the bottling process, the transfer conveyor arrangement outwardly transfers the treated unformed beverage bottle or container structures to a storage arrangement, which comprises a collecting container.

6. The beverage bottle or container filling plant according to claim 5, wherein the treatment arrangement has at least one driven endless circulating transport element for the unformed beverage bottle or container structures; the treatment arrangement comprises a heating arrangement, the forming arrangement comprises a stretch blow molding machine, and the unformed beverage bottle or container structures comprise beverage bottle or container preforms made of thermoplastic plastic; and the forming arrangement has at least one rotor that can be driven in rotation around a vertical machine axis with a plurality of forming molds that are provided on the rotor periphery.

* * * * *